United States Patent
Ko et al.

(10) Patent No.: US 6,846,873 B2
(45) Date of Patent: Jan. 25, 2005

(54) END-MODIFIED DIENE COPOLYMER AND RUBBER COMPOSITION FOR TIRE TREAD INCLUDING THE SAME

(75) Inventors: YoungHoon Ko, Taejeon (KR); DongIl Yoon, Taejeon (KR); DaiSeung Choi, Taejeon (KR); JungSu Park, Asan (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 580 days.

(21) Appl. No.: 09/896,980

(22) Filed: Jun. 29, 2001

(65) Prior Publication Data

US 2002/0123554 A1 Sep. 5, 2002

(30) Foreign Application Priority Data

Jan. 3, 2001 (KR) .............................. 2001-129

(51) Int. Cl.$^7$ ................................. C08K 3/34
(52) U.S. Cl. ....................... 524/492; 524/495; 525/100; 525/105; 528/42
(58) Field of Search ................ 524/492, 495; 525/100, 105; 528/42

(56) References Cited

U.S. PATENT DOCUMENTS

| 3,078,254 A | 2/1963 | Zelinski et al. |
| 3,244,664 A | 4/1966 | Zelinski et al. |
| 3,281,383 A | 10/1966 | Zelinski et al. |
| 3,692,874 A | 9/1972 | Farrar et al. |
| 6,566,480 B2 * | 5/2003 | Ko et al. ............ 528/42 |

FOREIGN PATENT DOCUMENTS

| JP | 5415994 | 2/1979 |
| JP | 57087407 | 5/1982 |
| JP | 58162605 | 9/1983 |
| KR | 90006274 | 8/1990 |
| KR | 90008331 | 11/1990 |

* cited by examiner

*Primary Examiner*—Edward J. Cain
(74) *Attorney, Agent, or Firm*—Davidson, Davidson & Kappel, LLC

(57) ABSTRACT

The present invention relates to an end-modified diene copolymer and a rubber composition for tire tread containing the same. More particularly, the present invention relates to a polymer and a rubber composition for tire tread comprising a mixture of the polymer with a vulcanizing agent and an inorganic filler such as carbon black and silica, the polymer being prepared by reacting the active end of a conjugate diene polymer, or a copolymer comprising at least one conjugate diene compound and a vinyl-substituted aromatic compound, polymerization-initiated using an organic lithium catalyst, with a coupling agent. The rubber composition for tire treads comprising the end-modified diene copolymer as an ingredient rubber enhances rolling resistance and wet skid resistance as well as mechanical properties directly concerned to the properties of the tires.

9 Claims, No Drawings

END-MODIFIED DIENE COPOLYMER AND RUBBER COMPOSITION FOR TIRE TREAD INCLUDING THE SAME

BACKGROUND OF THE INVENTION

1. Field of the Invention

The present invention relates to an end-modified diene copolymer and a rubber composition for tire tread containing the same. More particularly, the present invention relates to a vulcanized elastomer and a rubber composition containing the same, in which the vulcanized elastomer is obtained by modifying the active ends of a conjugate diene polymer or a copolymer comprising at least one conjugate diene compound and a vinyl-substituted aromatic compound, polymerized in the presence of an organic lithium catalyst used as a polymerization initiator.

According to a recent trend in the automobile industry, the economical aspect is worth due consideration in relation to economization of natural resources and energy. Also, there is a need for guaranteeing durability, stability and savings in fuel and various approaches have been made to meet these requirements. It is the aim of the development of automobile tires to reduce the rolling resistance directly concerned to economization in fuel consumption.

The rubber of a running tire, when regularly transformed in a relatively low frequency band, has energy dispersion to provide the rolling resistance of the automobile tire. Such a resistance can be reduced with a decrease in the hysteresis loss that may occur while running the automobile tire. The measure of the rolling resistance is given as a value of tan δ (which is a loss index of the hysteresis, i.e., dynamic loss coefficient) measured at approximately 50 to 70° C. with the frequency converted to a temperature-based function according to a temperature conversion equation, Williams-Landel-Ferry equation.

On the other hand, some approaches are made to raise the wet skid resistance in order to enhance the braking performance of tires on the surface of a wet road, which is directly concerned to the stability. Automobile tires slide on the surface of a road when the driver applies the brake, and the tread part of the tires in direct contact with the surface of the road has a lot of energy loss due to frictional resistance. The wet skid resistance, which is provided by the motion of tires in a frequency band higher than the frequency band for the rolling resistance, is measured as a value of tan δ at around 0° C.

In order to satisfy the two opposite characteristics of tires, an ingredient rubber used for automobile tires includes a butadiene rubber obtained by the emulsion polymerization method, a styrene-butadiene rubber having a high cis content, a butadiene rubber having a low cis content, a styrene-butadiene rubber polymerized using an organic lithium catalyst, a natural rubber, and an isoprene rubber having a high cis content, which are used alone or in combination with two or more different types. However, these rubbers are insufficient to simultaneously meet the two requirements, wet skid resistance and rolling resistance.

Particularly, to have a low rolling resistance, the tire should have an increased content of a butadiene rubber having a low cis content or a natural rubber, a reduced amount of a filler such as carbon black, or an incremented amount of a cross-linking agent such as sulfur, in order to have a low rolling resistance.

These approaches may lower the rolling frictional resistance of tires but rather reduces the mechanical properties.

To have a high wet skid resistance, the tire should have an increased content of a styrene-butadiene rubber having a high styrene content (for example, at least about 30 wt. %) or a butadiene rubber having a high vinyl content (for example, at least 60 wt. %), or an increased amount of a filler such as carbon black or oil. These methods, however, increase the rolling resistance.

2. Description of Related Art

Methods for improving these characteristics are disclosed in Japanese Patent Kokai (Laid-Open) Nos. 57-87407 and 58-162605, in which the living end of a styrene-butadiene copolymer having an increased vinyl content using an organic lithium initiator is coupled to a tintetrachloride ($SnCl_4$) to improve both rolling resistance and processability mixing the rubbers for tire treads. However, the tires improved by these methods are not sufficiently superior in properties to the conventional ones.

Also, methods for reacting a halogenated silicon compound such as tetrachlorosilane with the living end of a polymer are disclosed in U.S. Pat. Nos. 3,281,383, 3,244,664 and 3,692,874 and Japanese Patent Kokai (Laid-Open) No. 54-15994. The polymers obtained by these methods are excellent in mechanical strength and abrasion resistance but have poor processability with the wet skid resistance deteriorated.

Alternatively, a multi-halogen-substituted hydrocarbon such as 1,3,5-tri(bromo methyl)benzene can be used as a coupling agent, which method is disclosed in U.S. Pat. No. 3,078,254 and disadvantageous in regard to non-uniform molecular weight distribution with a low coupling efficiency and poor performance. In another method disclosed in Korean Patent No. 90-6274, the active end of a copolymer comprising conjugate diene and styrene is modified with a carbodiimide type to provide good balance of properties such as wet skid resistance, tensile strength, bounce elasticity or exothermicity.

A similar method modifies the active end of a polymer with a multi-functional compound having a diglycidyl amino group to improve the performance of tires, which is disclosed in Korean Patent Laid-Open No. 90-8331. However, there is still a need for a rubber composition having more improved characteristics, particularly, rolling resistance, wet skid resistance and abrasion resistance with the recent growing demand from the fields of industries for all-weather tires.

DESCRIPTION OF THE INVENTION

In an attempt to solve the problems with conventional rubber for tire treads, the inventors of the present invention prepared a polymer made by reacting the active end of a conjugate diene polymer, or a copolymer comprising at least one conjugate diene compound and a vinyl-substituted aromatic compound, polymerization initiated using an organic lithium catalyst, with a coupling agent represented by the formula 1, and mixed the polymer with an inorganic filler, sulfur and a vulcanizing accelerator to produce a composition, which enhances the rolling resistance and wet skid resistance of tires as well as mechanical properties.

It is, therefore, an object of the present invention to provide an end-modified diene copolymer capable of enhancing rolling resistance and wet skid resistance as well as mechanical properties directly concerned to the properties of tires.

It is another object of the present invention to provide a rubber composition for tire tread comprising the above-mentioned vulcanized polymer.

To achieve the objects of the present invention, there is provided an end-modified diene copolymer prepared from a conjugate diene polymer or a copolymer comprising at least one conjugate diene compound and a vinyl-substituted aromatic compound, the conjugate diene polymer or the copolymer being obtained by polymerization using an organic lithium initiator in the presence of a non-polar solvent, the end-modified diene copolymer being prepared by modifying the active end of the conjugate diene polymer or the copolymer with at least one polysiloxane compound represented by the following formula (formula 1): $Y—\{C(R^3)(R^4)\}_c—Si(R^1)(R^2)—\{O—Si(R^1)(R^3)\}_d—\{C(R^3)(R^4)\}_c—Y$, in which Y represents $(X)_a(R)_bSi$, $(X)_a(R)_bC$ or $(X)_e(R^1)_f$ Bz-X; X represents a halogen atom such as F, Cl, Br or I; R represents a lower alkyl group containing 1 to 20 carbon atoms, including a methyl group, an ethyl group or a propyl group; $R^1$, $R^3$ and $R^4$ are same or different from one another and are selected from a hydrogen atom, a lower alkyl group 1 to 20 carbon atoms, a halogen-substituted alkyl group, or a halogen-substituted silane group; $R^2$ is the same as X or $R^1$, or represents $(X)_g(R^3)_hC—\{C(R^3)(R^4)\}_{c-1}$; a is 1 to 3; b is 0 to 2, wherein a +b=3; c is 1 to 1,000; d is 1 to 50,000; e and f are independently 0 to 4, wherein e+f=4; g and h are independently 0 to 3, wherein g+h=3; and Bz-X represents benzyl halogen.

In another aspect of the present invention, there is provided a rubber composition for tire treads comprising 100 parts by weight of an ingredient rubber containing at least 10 wt % of the end-modified diene copolymer according to claim 1, 10 to 100 parts by weight of an inorganic filler, 0.1 to 5 parts by weight of sulfur, and an vulcanization accelerator.

DETAILED DESCRIPTION OF THE INVENTION

Hereinafter, the present invention will be described in detail as follows.

(1) End-modified Diene Copolymer

To prepare an end-modified diene copolymer for use purpose as an ingredient rubber for tire treads, a conjugate diene compound or a vinyl-substituted aromatic compound is copolymerized in the presence of an organic lithium initiator.

A conjugate diene polymer and a copolymer comprising the conjugate diene compound and the vinyl-substituted aromatic compound thus obtained have an initial weight average molecular weight ranging from 1,000 to 300,000 as measured by the GPC (Gel Permeation Chromatography) using polystyrene as a reference substance.

The organic lithium initiator usable as a polymerization initiator is a hydrocarbon compound having at least one lithium atom, the specific examples of which may include ethyl lithium, propyl lithium, n-butyl lithium, sec-butyl lithium, tert-butyl lithium, phenyl lithium, prophenyl lithium, hexyl lithium, 1,4-dilithio-n-butane and 1,3-di(2-lithio-2-hexyl)benzene, preferably n-butyl lithium and sec-butyl lithium.

These organic lithium initiators may be used alone or in combination as a mixture of two or more different kinds. The used amount of the organic lithium initiator, although variable depending on the target molecular weight of the produced polymer, is typically 0.1 to 5 mmole, preferably 0.3 to 4 mmole per 100 g of the monomer Examples of a hydrocarbon solvent for polymerization as used herein include n-butane, iso-pentane, n-hexane, n-heptane, iso-octane, cyclohexane, methylcyclopentene benzene and toluene, preferably n-hexane, n-heptane and cyclohexane. The hydrocarbon solvent is used in an amount of 1 to 20 parts by weight per one part by weight of the monomer.

For the conjugate diene polymer and the copolymer comprising the conjugate diene compound and the vinyl-substituted aromatic compound as mentioned above, the conjugate diene compound is selected from the group consisting of isoprene and 1,3-butadiene, the vinyl-substituted aromatic compound being selected from the group consisting of styrene and alpha-methyl styrene.

The conjugate diene polymer and the copolymer comprising the conjugate diene compound and the vinyl-substituted aromatic compound may include 10 to 100 wt % of the conjugate diene monomer and 0 to 90 wt % of the vinyl-substituted aromatic monomer.

The end of the conjugate diene polymer or the copolymer comprising the conjugate diene compound and the vinyl-substituted aromatic compound is then modified in the presence of a coupling agent, which is an organic compound having a siloxane group as represented by formula 1.

Preferably, the end-modified styrene-butadiene copolymer rubber of the present invention has styrene content in the range from 5 to 45 wt %. If the styrene content exceeds 45 wt %, the rebound elasticity decreases due to high heat build-up; otherwise, if less than 5 wt %, mechanical properties of the rubber such as tensile strength deteriorate.

The Mooney viscosity ($ML_{1+4}$, 100° C.) of the polymer before coupling is preferably 10 to 100, more preferably 20 to 80. After coupling, the Mooney viscosity of the polymer is preferably in the range from 40 to 200. If the Mooney viscosity of the polymer after coupling is less than 40, tensile strength, heat build-up and rebound elasticity deteriorates; otherwise, if exceeding 200, processability deteriorates.

According to the present invention, the copolymer comprising the conjugate diene compound and the vinyl-substituted aromatic compound has a vinyl content ranging from 20 to 90% by mole relative to conjugate diene, and a vinyl-substituted aromatic compound content of less than 45 wt %. Each end of the copolymer contains at least 0.05 molar equivalent of the above-mentioned functional groups based on 1 mole of the initiator.

That is, the used amount of the coupling agent represented by the formula 1 is preferably more than 0.05M (mole) with respect to 1M of the organic lithium initiator.

(2) Rubber Composition for Tire Treads

The end-modified diene copolymer thus obtained above may be used alone or in combination with other known rubbers as an ingredient rubber in a rubber composition for tire treads. When using two or more different types in combination, the end-modified diene copolymers are mixed to be more than 10 wt %, preferably more than 50 wt % based on the total weight of the ingredient rubber in order to improve rolling resistance or wet skid resistance.

The rubber composition includes an inorganic filler for normal tire tread, a vulcanizing agent, and a vulcanizing accelerator based on 100 parts by weight of the ingredient rubber. Examples of the inorganic filler as used herein may include silica or carbon black.

The content of the inorganic filler is preferably 10 to 100 parts by weight based on 100 parts by weight of the ingredient rubber. If the content of the inorganic filler is less than 10 parts by weight, the inorganic filler hardly has an reinforcement effect on the rubber as not to enhance the mechanical properties of the rubber composition; otherwise, if exceeding 100 parts by weight, the compatibility of the inorganic filler with the rubber is so deteriorated as not to form a uniform mixture.

The content of sulfur is preferably 0.1 to 5 parts by weight based on 100 parts by weight of the ingredient rubber. If the content of sulfur is less than 0.1 part by weight, the sulfur hardly has a cross-linking effect on the rubber as not to enhance the mechanical properties of the rubber composition; otherwise, if exceeding 5 parts by weight, the elasticity of the cross-linked material is so deteriorated as not to provide the characteristics of the rubber.

Of course, the rubber composition includes a vulcanizing accelerator and, if necessary, other rubber compounding agents.

For use purpose in the tire tread, such a diene polymer may be used alone or in combination with other rubbers, which is then vulcanized in combination with carbon black, silica and a vulcanizing agent.

The tire tread rubber thus obtained has enhanced characteristics, including rolling resistance properly harmonized with wet skid resistance, and other mechanical properties such as tensile strength.

Now, the present invention will be described in further detail by way of the following examples, which are not intended to limit the scope of the invention.

EXAMPLE 1

Synthesis of End-modified Styrene-butadiene Copolymer

A 5 l stainless steel reactor was washed, dried and flushed with nitrogen. Thereafter, 300 g of 1,3-butadiene, 100 g of styrene, 2,400 g of cyclohexane (solvent), 5 g of tetrahydrofuran (THF) and 1.6 ml of n-butyl lithium (2M-cyclohexane solution) were added to the reactor.

After initiating polymerization at 40° C. with stirring for one hour, a polysiloxane compound represented by the formula 2 with the average length of the siloxane unit being 13(d=13) and c=2 was added in an amount of 0.09M per 1 M of the n-butyl lithium.

Formula 2

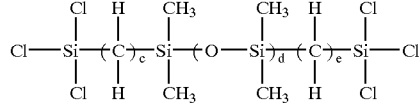

The reaction mixture was stirred for more 30 minutes, and an excess of 2,6-di-t-butyl-p-cresol (15 w/w % cyclohexane solution) with respect to the mole number of the initiator was added to the polymer solution to suspend the polymerization reaction. The polymer was then dried under vacuum at 60° C. for 24 hours to yield an end-modified styrene-butadiene copolymer.

The Mooney viscosity $ML_{1+4}$ (100° C.) of the rubber thus obtained was 76 as measured with a Mooney viscometer. The bound styrene content and the vinyl content of butadiene were 25 wt % and 40 wt %, respectively, as analyzed by $^1$H-NMR.

EXAMPLE 2

Synthesis of End-modified Styrene-butadiene Copolymer

The procedures were performed to yield an end-modified styrene-butadiene copolymer in the same manner as described in Example 1, excepting that a polysiloxane compound represented by the formula 2 with the average length of the siloxane unit being 7(d=7) and c=2 was used as a coupling agent.

The fine structure and the Mooney viscosity of the rubber thus obtained are summarized in Table 1.

Comparative Example 1

Synthesis of End-modified Styrene-butadiene Copolymer

A 5 l stainless steel reactor was washed, dried and flushed with nitrogen. Thereafter, 295 g of 1,3-butadiene, 100 g of styrene, 2,400 g of cyclohexane (solvent), 5 g of tetrahydrofaran (THF) and 1.6 ml of n-butyl lithium (2M-cyclohexane solution) were added to the reactor.

After initiating polymerization at 40° C. with stirring for one hour and polymerization for more one hour, 5 g of 1,3-butadiene was further added, followed by addition of 0.15M of $SnCl_4$ per 1M of n-butyl lithium to continue the polymerization reaction for more 30 minutes. Then, 2,6-di-t-butyl-p-cresol(15 w/w % cyclohexane solution) was added to the polymer solution to completely terminate the polymerization reaction.

EXAMPLES 3 AND 4

Synthesis of End-modified Styrene-butadiene Copolymer

The procedures were performed to yield an end-modified styrene-butadiene copolymer in the same manner as described in Examples 1 and 2, excepting that 300 g of 1,3-butadiene, 80 g of styrene, 2,280 g of cyclohexane (solvent), 45 g of tetrahydrofuran (THF) and 2.2 ml of n-butyl lithium (2M cyclohexane solution) were added to initiate polymerization at 35° C. After the completion of the polymerization reaction, the polymer was dried under vacuum at 60° C. for 24 hours to yield an end-modified styrene-butadiene copolymer.

The Mooney viscosity $ML_{1+4}$ (100° C.) of the rubber thus obtained was 51 as measured with a Mooney viscometer. The bound styrene content and the vinyl content of butadiene were 21 wt % and 63 wt %, respectively, as measured with $^1$H-NMR equipment. The fine structure and the Mooney viscosity of the rubber modified with the polysiloxane of the formula 2 are summarized in Table 1. The microstructure of the polymer was analyzed by $^1$H-NMR.

Comparative Example 2

Synthesis of End-modified Styrene-butadiene Copolymer

A 5 l stainless steel reactor was washed, dried and flushed with nitrogen. Thereafter, 295 g of 1,3-butadiene, 100 g of styrene, 2,400 g of cyclohexane (solvent), 45 g of tetrahydrofuran(THF) and 2.2 ml of n-butyl lithium(2M-cyclohexane solution) were added to the reactor.

After initiating polymerization at 40° C. with stirring for one hour, 5 g of 1,3-butadiene was further added, followed by addition of 0.15M of $SnCl_4$ per 1M of n-butyl lithium to continue the polymerization reaction for more 30 minutes. Then, 2,6-di-t-butyl-p-cresol (15 w/w % cyclohexane solution) was added to the polymer solution to completely terminate the polymerization reaction.

TABLE 1

|  | Examples | | | | Comparative Examples | |
|---|---|---|---|---|---|---|
| Rubber | 1 | 2 | 3 | 4 | 1 | 2 |
| Bound Styrene Content (wt %) | 25 | 25 | 21 | 21 | 25 | 21 |
| Coupling Agent | Formula 2 ($d^{1)}$ = 3) | Formula 2 (d = 3) | Formula 2 (d = 3) | Formula 2 (d = 3) | $SnCl_4$ | $SnCl_4$ |
| Weight Average Molecular Weight (Mw) Before Coupling (× $10^4$) | 15 | 15 | 10 | 10 | 15 | 10 |
| Vinyl Content (wt %) | 40 | 40 | 63 | 63 | 40 | 63 |
| Molecular Weight Distribution (MwD) | 2.9 | 2.7 | 2.7 | 2.8 | 2.8 | 2.7 |
| Weight Average Molecular Weight (Mw) After Coupling (× $10^4$) | 52 | 51 | 34 | 35 | 48 | 33 |

Note)
$d^{1)}$: Number of the repeating unit of siloxane

EXAMPLES 5 TO 8

Comparative Examples 3 and 4

Synthesis of Rubber for Tire Tread

Rubber compositions for tire tread containing the diene copolymers obtained in Examples 1 to 4 and Comparative Examples 1 and 2 are defined as Table 2.

The rubbers prior to mixing as listed in Table 1 was processed into sample pieces of a desired composition in a 250 ml bravender type mixer. Sulfur and a vulcanizing accelerator were used in such an amount as to provide optimal conditions for the rubber compositions. The individual rubber compositions were vulcanized at 145° C. for 10 to 30 minutes to produce the final test samples.

TABLE 2

|  | Part by Weight |
|---|---|
| Rubber Polymer | 100 |
| Paraffin Oil | 20 |
| Silica | 60 |
| Coupling Agent | 4.8 |
| Zinc Oxide | 3 |
| Stearic Acid | 2 |
| Anti-oxidant | 1 |
| Sulfur | 1.5 |
| Vulcanizing Accelerator | 3.3 |

The characteristics of the rubber compositions for tire treads were measured after vulcanization. The results are presented in Table 3.

The tensile strength was measured according to the JIS-K-6301. The rolling resistance and the wet skid resistance were determined using the DMA and compared with the Comparative Examples. Reference was measured at 60° C. for rolling resistance and at 0° C. for wet skid resistance.

TABLE 3

| Rubber for Tire Treads | Examples | | | | Comparative Examples | |
|---|---|---|---|---|---|---|
|  | 5 | 6 | 7 | 8 | 3 | 4 |
| Diene Copolymer | $A^{1)}$ 1 | $A^{1)}$ 2 | $A^{1)}$ 3 | $A^{1)}$ 4 | $B^{2)}$ 1 | $B^{2)}$ 2 |
| Mooney Viscosity $ML_{1+4}$ (100° C.) Before Mixing | 76 | 75 | 51 | 52 | 74 | 52 |
| Mooney Viscosity $ML_{1+4}$ (100° C.) After Mixing | 85 | 81 | 60 | 61 | 60 | 43 |
| Roll Processability | Good | Good | Good | Good | Good | Good |
| Tensile Strength (kgf/cm$^2$) | 152 | 149 | 128 | 126 | 130 | 110 |
| 300% Moldulus (kgf/cm$^2$) | 152 | 149 | 125 | 120 | 126 | 107 |
| Elongation (%) | 320 | 320 | 310 | 320 | 310 | 310 |
| Wet Skid Resistance (tan δ, 0° C.) | 0.168 | 0.159 | 0.289 | 0.281 | 0.140 | 0.271 |
| Rolling Resistance (tan δ, 0° C.) | 0.0689 | 0.0687 | 0.0897 | 0.0895 | 0.0729 | 0.0933 |

Note)
$A^{1)}$: Example
$B^{2)}$: Comparative Example

It can be seen from the results of Table 3 that the tire tread using the rubber end-modified with an organic compound having a siloxane group according to the present invention enhanced tensile strength, wet skid resistance and rolling resistance relative to those using the conventional rubber modified with tin tetrachloride. More particularly, wet skid resistance and rolling resistance were remarkably enhanced. The wet skid resistance increased with the higher tan δ value at 0 ° C., while the rolling resistance increased with the lower tan δ value.

The tire tread obtained in Comparative Example 4 had a high wet skid resistance but a low rolling resistance.

EXAMPLE 9

Synthesis of End-modified Styrene-butadiene Copolymer 5 l stainless steel reactor was washed, dried and flushed with nitrogen. Thereafter, 300 g of 1,3-butadiene, 150 g of styrene, 2,250 g of cyclohexane(solvent), 5 g of tetrahydrofuran (THF) and 1.2 ml of n-butyl lithium (2M-cyclohexane solution) were added to the reactor.

After initiating polymerization at 35° C. with stirring for about one hour, a polysiloxane compound represented by the formula 2 with the average length of the siloxane unit being 20(d=20) and c=2 was added prior to interruption of the polymerization reaction in an amount of 0.13M per 1M of the n-butyl lithium used as a polymerization initiator.

The reaction mixture was stirred for more 30 to 40 minutes, and an excess of 2,6-di-t-butyl-p-cresol (15 w/w % cyclohexane solution) was added to the polymer solution to terminate the polymerization reaction. The polymer was then dried under vacuum to yield a solid end-modified styrene-butadiene copolymer. The Mooney viscosity $ML_{1+4}$ (100° C.) of the rubber thus obtained was 129 as measured with a Mooney viscometer. The bound styrene content and the vinyl content of butadiene were 30 wt % and 40 wt %, respectively.

EXAMPLE 10

Synthesis of End-modified Styrene-butadiene Copolymer

The procedures were performed to yield an end-modified styrene-butadiene copolymer in the same manner as described in Example 9, excepting that a polysiloxane compound represented by the formula 2 with the average length of the siloxane unit being 7(d=7) and c=3 was used as a coupling agent. The fine structure and the Mooney viscosity of the rubber thus obtained are summarized in Table 4.

The microstructure of the polymer was analyzed by $^1$H-NMR.

Comparative Example 5

Synthesis of End-modified Styrene-butadiene Copolymer

A 5 l stainless steel reactor was washed, dried and flushed with nitrogen. Thereafter, 295 g of 1,3-butadiene, 100 g of styrene, 2,400 g of cyclohexane (solvent), 5 g of tetrahydrofuran (THF) and 1.2 ml of n-butyl lithium (2M-cyclohexane solution) were added to the reactor.

After initiating polymerization at 40° C. with stirring for one hour and polymerization for more one hour, 5 g of 1,3-butadiene was further added, followed by addition of 0.15M of $SnCl_4$ per 1M of n-butyl lithium to continue the polymerization reaction for more 30 minutes. Then, 2,6-di-t-butyl-p-cresol (15 w/w % cyclohexane solution) was added to the polymer solution to completely terminate the polymerization reaction. The microstructure and the Mooney viscosity of the rubber thus obtained are summarized in Table 4. The microstructure of the polymer was analyzed by $^1$H-NMR (equipment).

TABLE 4

| Rubber | Example 9 | Example 10 | Comparative Example 5 |
|---|---|---|---|
| Styrene Content (wt %) | 30 | 30 | 30 |
| Coupling Agent | Formula 2 (d = 20) | Formula 2 (d = 7) | $SnCl_4$ |
| Vinyl Content (wt %) | 40 | 40 | 40 |
| Mooney Viscosity ($ML_{1+4}$, 100° C.) | 128 | 129 | 127 |
| Weight Average Molecular Weight Before Coupling (× 10$^4$) | 18.7 | 19 | 19 |
| Molecular Weight Distribution | 2.8 | 2.6 | 2.4 |
| Weight Average Molecular Weight After Coupling (× 10$^4$) | 75 | 80 | 79 |
| Test Sample | G | H | I |

EXAMPLES 11 AND 12

Comparative Example 6

Synthesis of Rubber for Tire Tread

Rubber compositions for tire treads containing the diene copolymers obtained in Examples 9 and 10 and Comparative Example 5 are defined as Table 5.

The rubber compositions as listed in Table 5 were evaluated in regard to processibility and properties of vulcanized materials. The results are presented in Table 6.

TABLE 5

|  | Parts by Weight |
|---|---|
| Rubber Polymer | 100 |
| Paraffin Oil | 37 |
| Silica | 64 |
| Coupling Agent | 4.6 |
| Zinc Oxide | 5 |
| Stearic Acid | 2 |
| Anti-oxidant | 1 |
| Sulfur | 1.5 |
| Vulcanizing Accelerator | 2.9 |

The characteristics of the rubber compositions for tire treads were measured after vulcanization. The results are presented in Table 6. The tensile strength was measured according to the JIS-K-6301. The rolling resistance and the wet skid resistance were determined using the DMA and compared with the Comparative Examples. Reference was measured at 60° C. for rolling resistance and at 0° C. for wet skid resistance.

TABLE 6

| Rubber for Tire Tread | Example 11 | Example 12 | Comparative Example 6 |
|---|---|---|---|
| Diene Copolymer | Example 9 | Example 10 | Comparative Example 5 |
| Mooney Viscosity $ML_{1+4}$ (100° C.) Before Mixing | 128 | 129 | 127 |
| Mooney Viscosity $ML_{1+4}$ (100° C.) After Mixing | 109.2 | 110 | 91 |
| Roll Processibility | Good | Good | Good |
| Tensile Strength (kgf/cm$^2$) | 163 | 157 | 145 |
| 300% Moldulus (kgf/cm$^2$) | 111 | 109 | 95 |
| Elongation (%) | 411 | 409 | 400 |
| Wet Skid Resistance (tan δ, 0° C.) | 0.584 | 0.454 | 0.511 |
| Rolling Resistance (tan δ, 0° C.) | 0.116 | 0.121 | 0.135 |

It can be seen from the results of Table 6 that the tire treads using the rubber end-modified with an organic siloxane compound according to the present invention enhanced tensile strength, wet skid resistance and rolling resistance relative to those obtained in the comparative example. More particularly, wet skid resistance and rolling resistance were remarkably enhanced.

As described above in detail, in accordance with the present invention, the active ends of a conjugate diene polymer initiated with an organic lithium catalyst and a copolymer comprising at least one conjugate diene compound and a vinyl-substituted aromatic compound are modified with a compound having siloxane groups and the modified rubber is mixed with additives for tire treads in preparation of a rubber composition, The rubber composition thus obtained has dramatically improved mechanical properties such as tensile strength, i.e., provides a high wet skid resistance that indicates the braking performance of tires on the surface of a wet road directly related to the stability, and a low rolling resistance directly concerned to fuel savings.

What is claimed is:

1. An end-modified diene copolymer prepared from a conjugate diene polymer or a copolymer comprising at least one conjugate diene compound and a vinyl-substituted aromatic compound, the conjugate diene polymer or the copolymer being obtained by polymerization using an organic lithium initiator in the presence of a non-polar solvent, the end-modified diene copolymer being prepared by modifying the active end of the conjugate diene polymer or the copolymer with at least one polysiloxane compound represented by the following formula 1,

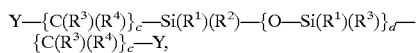

in which:

Y represents $(X)_a(R)_b Si$, $(X)_a(R)_b C$ or $(X)_e(R^1)_f Bz\text{-}X$;

X represents a halogen atom selected from the group consisting of F, Cl, Br or I;

R represents a lower alkyl group containing 1 to 20 carbon atoms, including a methyl group, an ethyl group or a propyl group;

$R^1$, $R^3$ and $R^4$ are same or different from one another and are selected from a hydrogen atom, a lower alkyl group 1 to 20 carbon atoms, a halogen-substituted alkyl group, or a halogen-substituted silane group;

$R^2$ is the same as X or $R^1$, or represents $(X)_g(R^3)_h C\text{---}\{C(R^3)(R^4)\}_{c-1}$;

a is 1 to 3;

b is 0 to 2, wherein a+b=3;

c is 1 to 1,000;

d is 1 to 50,000;

e and f are independently 0 to 4, wherein e+f=4;

g and h are independently 0 to 3, wherein g+h=3; and

Bz-X represents benzyl halogen.

2. The end-modified diene copolymer as claimed in claim 1, wherein the organic lithium initiator comprises at least one selected from the group consisting of ethyl lithium, propyl lithium, n-butyl lithium, sec-butyl lithium, tert-butyl lithium, phenyl lithium and prophenyl lithium.

3. The end-modified diene copolymer as claimed in claim 1, wherein the compound represented by formula 1 is used in an amount of at least 0.01M with respect to 1M of the organic lithium initiator.

4. The end-modified diene copolymer as claimed in claim 1, wherein the conjugate diene polymer, or the copolymer comprising at least one conjugate diene monomer and a vinyl-substituted aromatic monomer includes 10 to 100 wt % of the conjugate diene monomer and 0 to 90 wt % of the vinyl-substituted aromatic monomer.

5. The end-modified diene copolymer as claimed in claim 1, wherein the conjugate diene polymer or the conjugate diene copolymer has a weight average molecular weight in the range from 1,000 to 1,200,000.

6. The end-modified diene copolymer as claimed in claim 1, wherein the conjugate diene compound is selected from the group consisting of isoprene and 1,3-butadiene, the vinyl-substituted aromatic compound being selected from the group consisting of styrene and alpha-methyl styrene.

7. The end-modified diene copolymer as claimed in claim 1, wherein the end-modified diene copolymer has a vinyl bond of butadiene being 10 to 70%, a molecular weight distribution of 1.1 to 3, and a Mooney viscosity of 10 to 200.

8. A rubber composition for tire treads comprising 100 parts by weight of an ingredient rubber containing at least 10 wt % of an end-modified diene copolymer prepared from a conjugate diene polymer or a copolymer comprising at least one conjugate diene compound and a vinyl substituted aromatic compound, the conjugate diene polymer or the copolymer being obtained by polymerization using an organic lithium initiator in the presence of a non-polar solvent, the end-modified diene copolymer being prepared by modifying the active end of the conjugate diene polymer or the copolymer with at least one polysiloxane compound represented by the following formula:

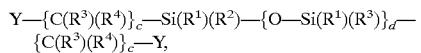

in which:

Y represents $(X)_a(R)_b Si$, $(X)_a(R)_b C$ or $(X)_e(R^1)_f Bz\text{-}X$;

X represents a halogen atom selected from the group consisting of F, Cl, Br or I;

R represents a lower alkyl group containing 1 to 20 carbon atoms, including a methyl group, an ethyl group or a propyl group;

$R^1$, $R^3$ and $R^4$ are same or different from one another and are selected from a hydrogen atom, a lower alkyl group 1 to 20 carbon atoms, a halogen-substituted alkyl group, or a halogen-substituted silane group;

$R^2$ is the same as X or $R^1$, or represents $(X)_g(R^3)_h C\text{---}\{C(R^3)(R^4)\}_{c-1}$;

a is 1 to 3;

b is 0 to 2, wherein a+b=3;

c is 1 to 1,000;

d is 1 to 50,000;

e and f are independently 0 to 4, wherein e+f=4;

g and h are independently 0 to 3, wherein g+h=3; and

Bz-X represents benzyl halogen, 10 to 100 parts by weight of an inorganic filler, 0.1 to 5 parts by weight of sulfur, and an vulcanization accelerator.

9. The rubber composition for tire treads as claimed in claim 8, wherein the inorganic filler includes silica or carbon black.

* * * * *